(12) United States Patent
Fu et al.

(10) Patent No.: US 10,368,359 B2
(45) Date of Patent: Jul. 30, 2019

(54) METHOD AND USER EQUIPMENT FOR PREDICTING AVAILABLE THROUGHPUT FOR UPLINK DATA

(71) Applicant: GUANGDONG OPPO MOBILE TELECOMMUNICATIONS CORP., LTD., Dongguan (CN)

(72) Inventors: Jing Fu, Solna (SE); Steven Corroy, Stockholm (SE); Vincent Huang, Sollentuna (SE)

(73) Assignee: GUANGDONG OPPO MOBILE TELECOMMUNICATIONS CORP., LTD., Dongguan, Guangdong (CN)

( * ) Notice: Subject to any disclaimer, the term of this patent is extended or adjusted under 35 U.S.C. 154(b) by 5 days.

(21) Appl. No.: 15/315,279

(22) PCT Filed: Jun. 4, 2014

(86) PCT No.: PCT/SE2014/050676
§ 371 (c)(1),
(2) Date: Nov. 30, 2016

(87) PCT Pub. No.: WO2015/187071
PCT Pub. Date: Dec. 10, 2015

(65) Prior Publication Data
US 2017/0202000 A1 Jul. 13, 2017

(51) Int. Cl.
*H04W 72/08* (2009.01)
*H04W 28/02* (2009.01)
(Continued)

(52) U.S. Cl.
CPC .......... *H04W 72/085* (2013.01); *H04L 5/006* (2013.01); *H04W 28/0236* (2013.01);
(Continued)

(58) Field of Classification Search
CPC ......... H04W 28/0231; H04W 28/0236; H04W 28/0278
See application file for complete search history.

(56) References Cited

U.S. PATENT DOCUMENTS

| 2004/0185868 A1 | 9/2004 | Jain et al. |
| 2005/0113028 A1 * | 5/2005 | Uchida ................. H04W 48/16 455/67.7 |

(Continued)

FOREIGN PATENT DOCUMENTS

| EP | 1335505 A1 | 8/2003 |
| EP | 2458910 A1 | 5/2012 |

(Continued)

OTHER PUBLICATIONS

Supplementary European Search Report—EP 14893983.8—dated Feb. 20, 2018—pp. 5.

*Primary Examiner* — Pao Sinkantarakorn
(74) *Attorney, Agent, or Firm* — Finnegan, Henderson, Farabow, Garrett & Dunner LLP

(57) ABSTRACT

A method in a user equipment for predicting an available throughput for uplink data to be sent from the user equipment to a base station over a radio link. The user equipment obtains (201) an information about a past scheduling of the user equipment. The user equipment obtains (202) a radio quality measure related to the radio link. The user equipment predicts (204) the available throughput based on a relationship between the information about a past scheduling of the user equipment and one or more previously obtained pieces of information about the past scheduling of the user equipment. The user equipment predicts the available throughput further based on a relationship between the radio quality measure and of one or more previously obtained radio quality measures. The user equipment predicts the available throughput further based on a previously obtained through- (Continued)

put. The previously obtained throughput is associated with the one or more previously obtained pieces of information about a past scheduling and the one or more previously obtained radio quality measures.

14 Claims, 7 Drawing Sheets

(51) Int. Cl.
*H04L 5/00* (2006.01)
*H04W 72/04* (2009.01)
*H04L 12/801* (2013.01)
*H04W 28/24* (2009.01)

(52) U.S. Cl.
CPC ....... *H04W 72/0413* (2013.01); *H04L 47/127* (2013.01); *H04W 28/24* (2013.01)

(56) References Cited

U.S. PATENT DOCUMENTS

| | | |
|---|---|---|
| 2010/0189063 A1 | 7/2010 | Kokku et al. |
| 2012/0314607 A1 | 12/2012 | Craig et al. |
| 2014/0029455 A1 | 1/2014 | Vitthaladevuni et al. |
| 2014/0140313 A1 | 5/2014 | Liu et al. |
| 2014/0334318 A1* | 11/2014 | Pica ...................... H04W 36/14 370/252 |

FOREIGN PATENT DOCUMENTS

| | | |
|---|---|---|
| WO | 2010066855 A1 | 6/2010 |
| WO | 2010151189 A1 | 12/2010 |
| WO | 2011119075 A1 | 9/2011 |
| WO | 2012118414 A1 | 9/2012 |
| WO | 2013116400 A1 | 8/2013 |

\* cited by examiner

METHOD AND USER EQUIPMENT FOR PREDICTING AVAILABLE THROUGHPUT FOR UPLINK DATA

TECHNICAL FIELD

Embodiments herein relate to a user equipment and a method therein. In particular, they relate to throughput for uplink data.

BACKGROUND

Communication devices such as User Equipments (UE) are also known as e.g. mobile terminals, wireless terminals and/or mobile stations. User equipments are enabled to communicate wirelessly in a wireless communications network, sometimes also referred to as a wireless communication system, a cellular communications network, a cellular radio system or a cellular network. The communication may be performed e.g. between two user equipments, between a user equipment and a regular telephone and/or between a user equipment and a server via a Radio Access Network (RAN) and possibly one or more core networks, comprised within the cellular communications network.

User equipments may further be referred to as mobile telephones, cellular telephones, laptops, or surf plates with wireless capability, just to mention some further examples. The user equipments in the present context may be, for example, portable, pocket-storable, hand-held, computer-comprised, or vehicle-mounted mobile devices, enabled to communicate voice and/or data, via the RAN, with another entity, such as another user equipment or a server.

The wireless communications network covers a geographical area which is divided into cell areas, wherein each cell area is served by a base station, e.g. a Radio Base Station (RBS), which sometimes may be referred to as e.g. "eNB", "eNodeB", "NodeB" or "B node" depending on the technology and terminology used. The base stations may be of different classes such as e.g. macro eNodeB, home eNodeB or pico base station, based on transmission power and thereby also cell size. A cell is the geographical area where radio coverage is provided by the base station at a base station site. One base station, situated on the base station site, may serve one or several cells. Further, each base station may support one or several communication technologies. The base stations communicate over the air interface operating on radio frequencies with the user equipments within range of the base stations. In the context of this disclosure, the expression Downlink (DL) is used for the transmission path from the base station to the user equipment. The expression Uplink (UL) is used for the transmission path in the opposite direction i.e. from the user equipment to the base station.

3GPP LTE radio access standard has been written in order to support high bitrates and low latency both for uplink and downlink traffic. All data transmission is in LTE is controlled by the radio base station.

When a user equipment wants to initiate a data transmission in a wireless communications network, either by starting a new service session after input from a user, such as viewing a webpage, download a file, etc. or by a background process such as automatic software update, or user equipment data backup, no information about the available throughput for uplink data is provided by the network.

This may lead to network congestion as all user equipments regardless of the available throughput just starts data transmission, although congestion control is taken in upper layers such as Transmission Control Protocol, TCP. In addition, the initiated session may receive poor performance due to the offered low throughput, for example starting a video conference even though the available throughput is far less than satisfactory.

SUMMARY

It is therefore an object of embodiments hereinto provide an improved way of predicting an available throughput for uplink data to be sent from a user equipment in a wireless communications network.

According to a first aspect of embodiments herein, the object is achieved by a method in a user equipment for predicting an available throughput for uplink data to be sent from the user equipment to a base station over a radio link in a wireless communications network. The available throughput is provided by the communications network to the user equipment. The user equipment obtains an information about a past scheduling of the user equipment.

The user equipment further obtains a radio quality measure related to the radio link.

The user equipment then predicts the available throughput based on:
- a relationship between the information about a past scheduling of the user equipment and one or more previously obtained pieces of information about the past scheduling of the user equipment,
- a relationship between the radio quality measure and one or more previously obtained radio quality measures, and
- a previously obtained throughput of uplink data sent from the user equipment to the base station. The previously obtained throughput is associated with the one or more previously obtained pieces of information about a past scheduling and the one or more previously obtained radio quality measures.

According to a second aspect of embodiments herein, the object is achieved by a user equipment configured to predict an available throughput for uplink data to be sent from the user equipment to a base station over a radio link in a wireless communications network. The available throughput is provided from the communications network to the user equipment. The user equipment is configured to obtain an information about a past scheduling of the user equipment.

The user equipment is configured to obtain a radio quality measure related to the radio link.

The user equipment is configured to predict the available throughput based on a relationship between the information about a past scheduling of the user equipment and one or more previously obtained pieces of information about the past scheduling of the user equipment.

The user equipment is configured to predict the available throughput further based on a relationship between the radio quality measure and one or more previously obtained radio quality measures.

The user equipment is configured to predict the available throughput further based on a previously obtained throughput of uplink data sent from the user equipment to the base station. The previously obtained throughput is associated with the one or more previously obtained pieces of information about a past scheduling and the one or more previously obtained radio quality measures.

The user equipment predicts the available throughput based on information about the past scheduling of the user equipment. Since the information about the past scheduling of the user equipment is related to a cell load, the prediction of the available throughput is based on a cell load. This leads to an improved prediction of the available throughput, which leads to improved utilisation of radio resources.

The prediction is further improved since the prediction is based on both the information about the past scheduling of the user equipment, i.e. based on the cell load, and the radio quality measure.

The prediction is further improved since the user equipment predicts the available throughput based on: a relationship between the information about a past scheduling of the user equipment and one or more previously obtained pieces of information about the past scheduling of the user equipment; a relationship between the radio quality measure and one or more previously obtained radio quality measures; a previously obtained throughput of uplink data sent from the user equipment to the base station. For example, the user equipment may estimate the available throughput even during a period when the user equipment does not have data in the uplink buffer.

An advantage with embodiments herein is that it is the user equipment that predicts or estimates the throughput for uplink data. For example, embodiments herein may be deployed efficiently without modifying the current LTE architecture, and save computational resources at the base station. The embodiments further save communication resources because they do not require communication overhead. In other words, the user equipment is capable of predicting the throughput for uplink data without receiving any special information from the network.

Embodiments herein enable accurate prediction of the user equipment throughput by making not only use of physical quantities like Channel Quality Indicator (CQI) and rank but also cell load by processing the scheduling information of the user equipment. This prediction should be more accurate than existing solutions.

Comparing to the approaches that probe the end-to-end to paths to estimate the maximum throughput, this approach is a more passive approach that do no generate unnecessary packets to the network.

BRIEF DESCRIPTION OF THE DRAWINGS

Examples of embodiments herein are described in more detail with reference to attached drawings in which.

DETAILED DESCRIPTION

Figure 1:
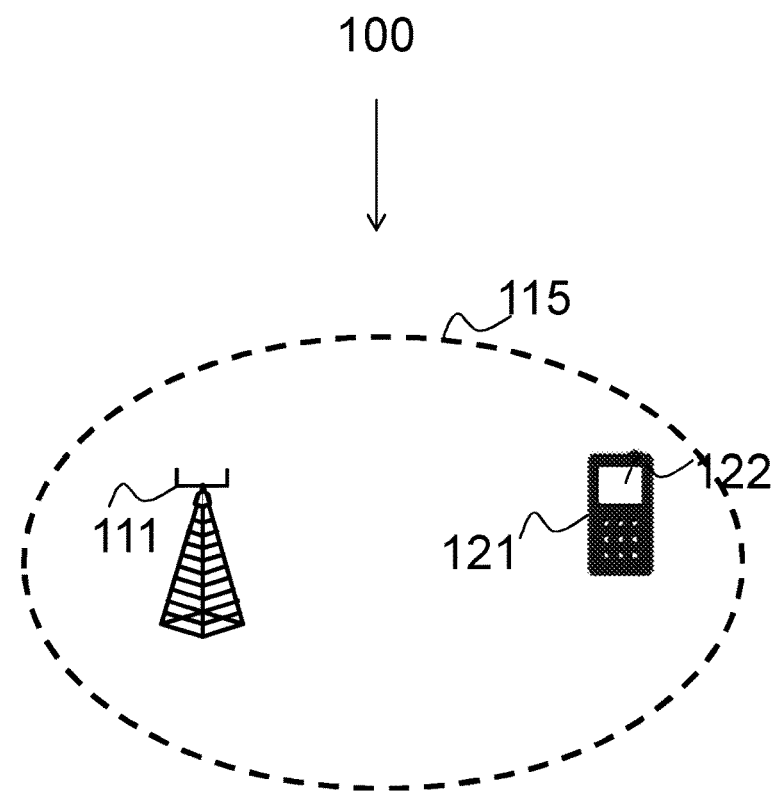
FIG. 1 is a schematic block diagram illustrating embodiments of a wireless communications network.

As part of developing embodiments herein, a problem will first be identified and discussed.

Uplink Scheduling

Since LTE uses Orthogonal Frequency Division Multiplexing (OFDM) modulation, the role of the uplink scheduler is to dynamically assign OFDM resource blocks to the user equipments for uplink transmission. These resource blocks assignments comprises of both time and frequency assignments.

Typically the uplink scheduling is performed at each Transmission Time Interval (TTI), where the TTI refers to the duration of a transmission on the radio link. To provide an optimal resource allocation the scheduler should take into account the difference in quality among resource blocks. Indeed, each user equipment will have a different channel gain on different resource blocks and a resource block might be more valuable for some user equipment than others.

When the user equipment has data in its uplink buffer to transmit in the uplink, it has to receive a resource grant from the base station. This resource grant typically comprises which OFDM resource blocks the user equipment is authorized to use in the next TTI. There may be a delay between the request for grant from the user equipment and the actual grant from the base station. If many user equipments are currently requesting resource blocks, it is possible that a specific user equipment is not scheduled during several TTI.

There exist many types of scheduler depending on the goals of a provider of a wireless communications network. One possibility is to maximize a specific metric with respect to some constraints. For example a scheduler maximizing the sum rate with some power constraint may be derived using a water-filling algorithm. In some common scheduler algorithms are:

Round-Robin Scheduler: This scheduler algorithm distributes the same number of resource blocks to all user equipment. It is simple but it may lead to very unfair resource allocation, where the user equipment at the cell edge get the same number of resources as the user equipment at the center of the cell, resulting in a large difference in terms of throughput.

Proportional fair scheduler: This scheduler addresses the weakness of the Round-Robin scheduler, i.e., the fairness. This scheduler allocates resources to user equipment according to priority mechanism. The priority of a user equipment is inversely proportional to the amount of data the user equipment has transmitted in previous communication phases. That way the scheduler algorithm makes sure that all user equipments are treated fairly in terms of throughput and not allocated resources.

Such a channel dependent scheduling is typically done in the downlink because it is relatively simple for a user equipment to measure its downlink quality. In the uplink however it requires the user equipment to transmit a Sounding Reference Signal (SRS) to the base station that will then estimate the uplink quality for the user equipment. This method may be costly in terms of resource overhead. The periodicity of the SRS may be varied from 2 ms, for very precise quality prediction, to about 160 ms, for looser prediction but smaller overhead.

To avoid this problem of overhead, but still providing a way for the scheduler to give more resources to a user equipment at the cell edge it is possible, instead of having a channel based scheduler, to use Medium Access Control (MAC) messages from the user equipment to indicate the uplink buffer status. In that way the scheduler may identify a user equipment that requires more resources than others. The MAC messages may be sent over the normal Physical Uplink Shared Channel (PUSCH) if the user equipment has got a scheduling grant but may also be transmitted with L1/L2 control signaling over the Physical Uplink Control Channel (PUCCH).

Radio Quality Measure

As mentioned above, in a case where a scheduler uses channel quality information to assign resource blocks to the user equipments, all user equipments have to send SRSs to the base station so that their uplink channel quality may be estimated. Based on the Signal to Interference and Noise Ratio (SINR) of the SRS the base station calculates a channel quality indicator—an integer value—that points to a row on the Modulation and Coding Scheme (MCS). Typically if the channel quality is good the user equipment will use a high order modulation scheme with a high coding rate and the opposite otherwise.

Another important factor that highly influences the quality of communication of a user equipment is its rank. In a multiple antenna communications network, the rank of a user equipment is the rank of the channel matrix from the user equipment to the base station. In a typical 2 by 2 Multiple Input Multiple Output (MIMO) communication the rank may be 1 or 2. A rank of 1 means that the user equipment may send one stream at a time. A rank of 2 allows the user equipment to transmit two orthogonal streams in parallel, resulting in a higher throughput. The rank is estimated based on the SRS at the base station.

When a user equipment wants to transmit data over the uplink, in order to estimate the actual throughput that it will get, it only has access to a CQI value, which is basically a derivate of the SINR at the base station. However, the final throughput that the user equipment will get is not only depending on its SINR but also highly on the cell load. In other words if there are many other user equipments in the cell, the final throughput of a specific user equipment will be much lower.

In the current system, in LTE, it is possible for the base station to gather this information and broadcast it to all user equipments. This, however, represents a large communication overhead since this information would need to be transmitted very frequently. Moreover the existing system would need to be modified to include these load reports in the system architecture. It is therefore preferable, if the prediction happens at the user equipment side. In this way the cell load is estimated directly by the user equipment without help from the base station.

Of course such a throughput prediction may be processed entirely at the base station for all user equipments since the SINR and the cell load is present at the base station. However a base station-based solution, which requires the help of the wireless communications network, has many drawbacks such as:

The complexity of the final solution is much higher; there is a need to develop specific exchange protocols and the current system architecture must be changed.

It increases the computational cost at the base station

It consumes more communication resources, i.e. high communication overhead

One solution to estimate bandwidth in the end device, e.g. in the user equipment, is to actively probe the network. In that solution, the end device puts packets in a queue so that the end device always have something to send, and the estimated throughput is based on packet size, transmission time, receive time, etc.

This has several problems. First, the end device, e.g. the user equipment, has to transmit at maximum speed in order to obtain the prediction, which wastes network resources. Second, this approach requires both end hosts to work jointly, as it requires receiver logging as well. This works well in some scenarios, but may have problems if the end device does not have access to the server's receiver log.

Embodiments herein estimate network load and potential user equipment throughput in the user equipment, without receiving any information about load or throughput from the network.

Based on the scheduling frequencies and the radio quality measure, the UE may estimate the load and the available throughput in the cell. This process may be done either separately or jointly.

In embodiments herein the network load is estimated based on the scheduling frequencies from the network when the user equipment has data in the uplink buffer. In general, if there are few user equipments in the cell, the user equipment is scheduled much more often than when there are more user equipments.

The cell load is estimated during the periods when the user equipment has data in the uplink buffer. In addition to the estimated cell load, the user equipment analyses its radio quality measures, for example CQI and rank in LTE systems. Based on the estimated cell load, the radio quality measures, and a previously obtained model, relating the cell load and the radio quality measures to the throughput, the user equipment predicts, or in other words estimates, the throughput in the given cell even during the periods when the user equipment does not have data in the uplink buffer. The model may be obtained by mapping previous cell loads and previous radio quality measures to previous throughputs, for example by machine learning. The previous cell loads and the previous radio quality measures may be referred to as training samples as they may be used to train the model. As new cell loads, radio quality measures and throughputs are obtained the model may be updated, for example by machine learning. The output from the machine learning may be used to predict future values of throughput by analysis of trends.

The load prediction and the throughput prediction may be used in several different ways. Firstly, this information may be shown to a user on a display of the user equipment. Then the user may use this information to further decide if the user wants to start a new service or not. Secondly, this information may be made available to the services running in the user equipment, which may benefit from knowing the network load and/or the available throughput for uplink data. For example, the network load and the available throughput for the uplink data from the user equipment may be estimated to adapt the resolution of a streamed video, for communication services like Skype, for the user equipment based on the expected performance.

FIG. 1 depicts a wireless communications network 100 in which embodiments herein may be implemented. The wireless communications network 100 may for example be an LTE network.

The wireless communications network 100 comprises a base station 111. The base station may also be referred to as a NodeB, an evolved Node B (eNB, eNode B), or any other network unit capable of communicating with a user equipment within a cell served by the base station depending e.g. on the radio access technology and terminology used.

The base station 111 may serve a cell 115. The base station 111 communicates with user equipments in the first cell 115, such as a user equipment 121, also referred to as a UE, a terminal or a wireless device. The communication is performed over a radio link.

The user equipment 131 may e.g. be a mobile terminal or a wireless terminal, a mobile phone, a computer such as e.g. a laptop, a Personal Digital Assistants (PDAs) or a tablet computer, sometimes referred to as a surf plate, with wireless capability, or any other radio network units capable to communicate over a radio link in a wireless communications network. Please note the term user equipment used in this document also covers other wireless devices such as Machine to Machine (M2M) devices, even though they do not have any user.

The user equipment 121 may comprise a display 122.

Figure 2:
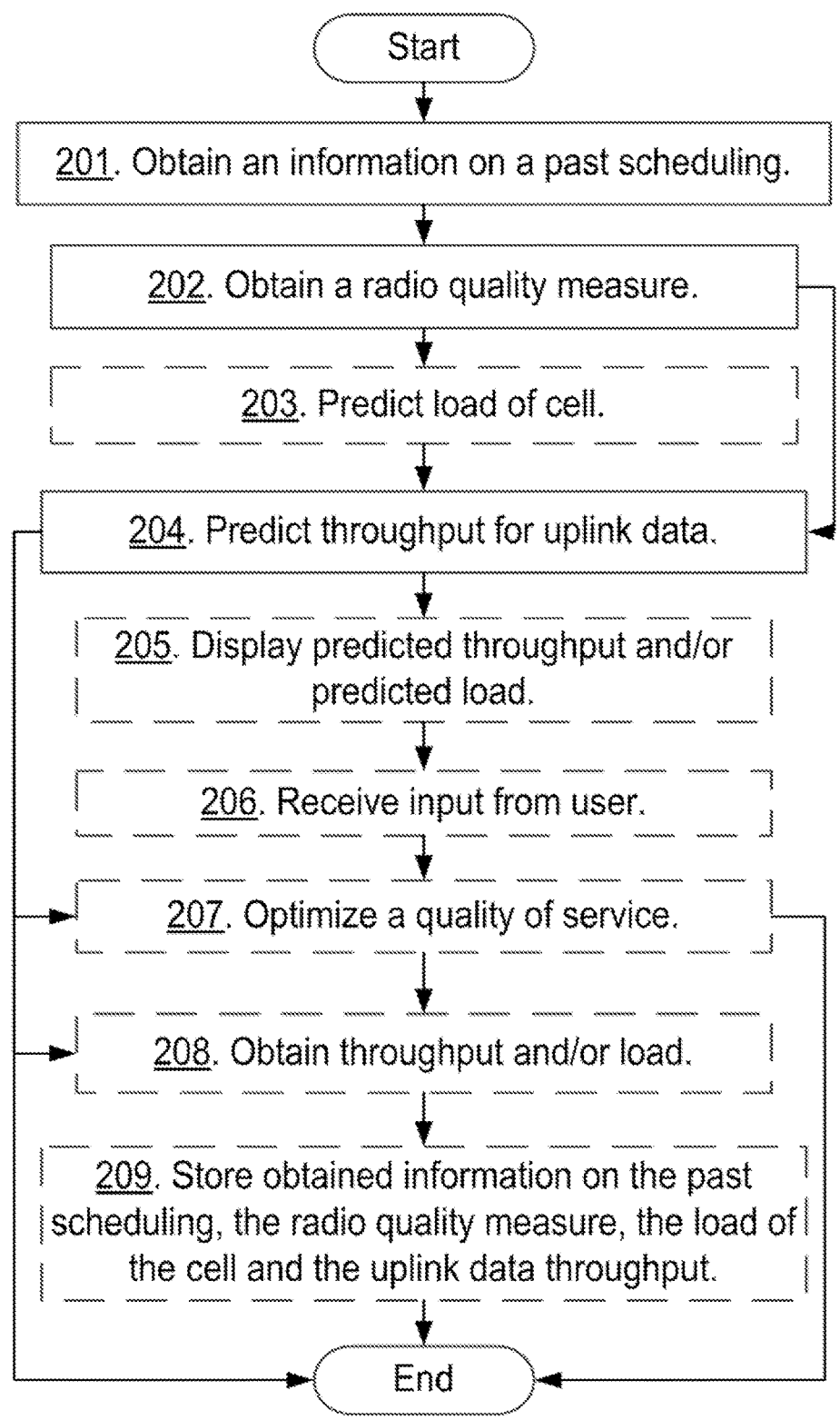
FIG. 2 is a flowchart depicting embodiments of a method in a user equipment.

Embodiments of a method in the user equipment 121 for predicting an available throughput for uplink data to be sent from the user equipment 121 to the base station 111 over the radio link in the communications network 100 will now be described with reference to a flowchart depicted in FIG. 2. As mentioned above, the available throughput is provided by the communications network 100 to the user equipment 121.

The method comprises the following actions, which actions may be taken in any suitable order.

Figure 3:
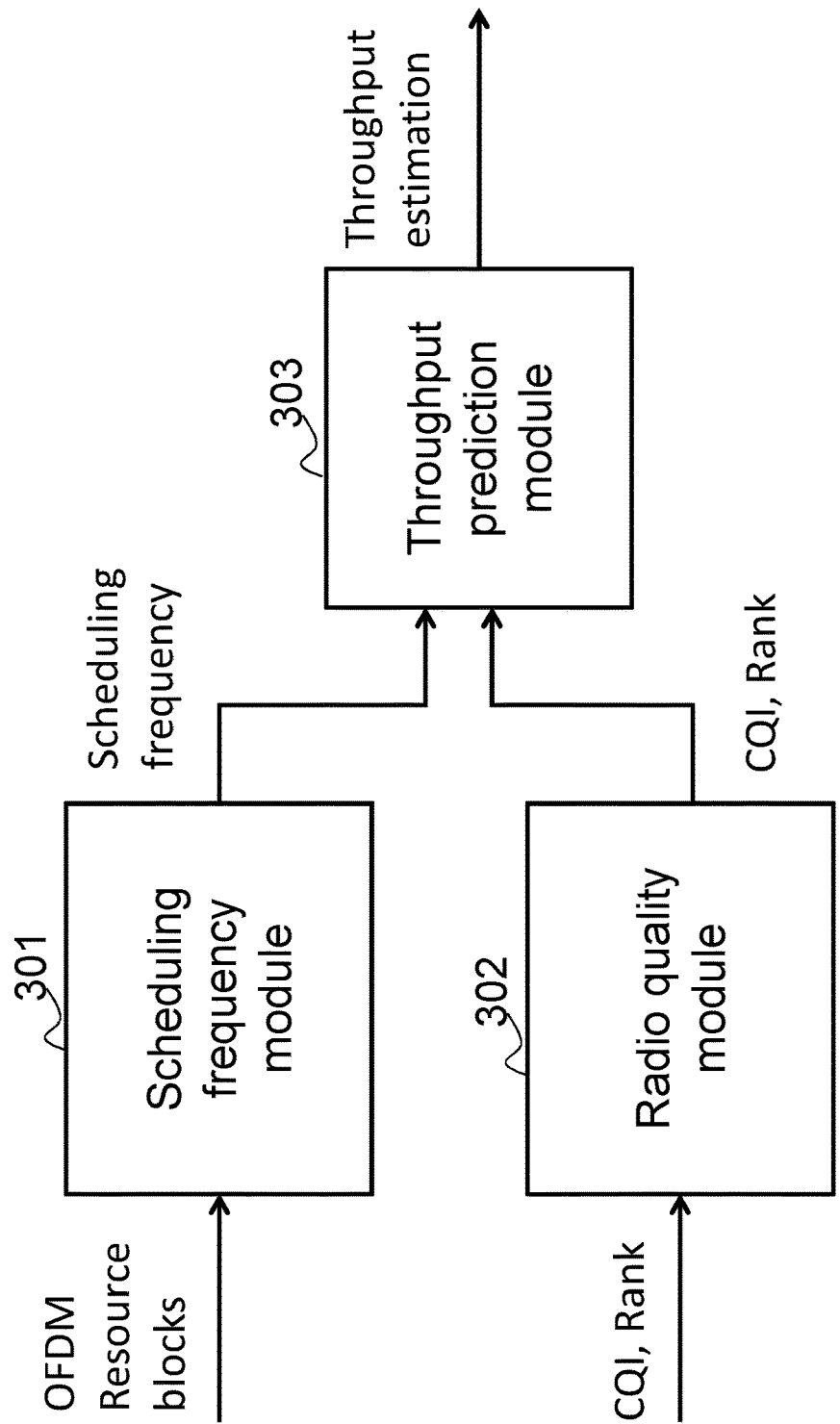
FIG. 3 is a schematic block diagram illustrating embodiments of a user equipment.

FIG. 3 further illustrates the system architecture of the embodiments herein. The system architecture may for example comprise three modules: a scheduling frequency module 301, a radio quality module 302, and a throughput prediction module 304.

Action 201

Since the cell load of the cell 115 is important for the available throughput, the user equipment 121 obtains information related to the cell load of the cell 115 as input to the prediction of the available throughput. The input to the prediction of the available throughput may for example be a frequency of scheduling of the user equipment 121. Thus, the user equipment 121 obtains an information about a past scheduling of the user equipment 121. The network load may be estimated based on the scheduling frequencies from the base station 111 during the time periods when the user equipment 121 has data in an uplink buffer. In general, if there are few user equipments in the cell, the user equipment is scheduled much more often than when there are more user equipments.

The obtaining of the information about a past scheduling may comprise obtaining for each TTI for which the user equipment 121 had uplink data in an uplink buffer, any combination out of:
  a number of physical resource blocks that are scheduled for the user equipment 121 for a priority class;
  a total number of physical resource blocks in the cell 115; and
  an information about a buffer status of the user equipment 121. The information about the buffer status comprises an amount of uplink data per priority class.

Figure 4:
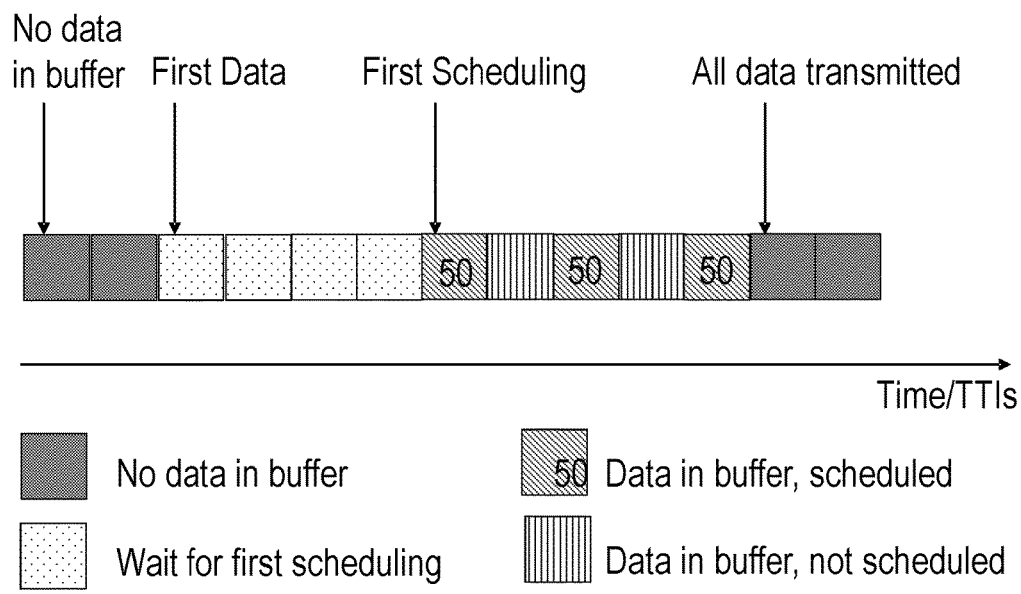
FIG. 4 is a schematic block diagram illustrating further embodiments of a method in a user equipment.

For example, based on previous uplink transmissions, the user equipment 121 logs the TTIs when the user equipment 121 has data in its uplink buffer, if the user equipment 121 is scheduled and the amount of resources in physical resource blocks the user equipment 121 is scheduled in each TTI. The logging of uplink scheduling is shown in FIG. 4. In FIG. 4 for each TTI the scheduling information is shown, and the scheduling may take four different states for each TTI.

No data in buffer means that there are currently no data in the uplink buffer to send, of course no data need to be transmitted.

Waiting for first uplink transmission means that there are data in the uplink buffer, but the data is not scheduled and has never been scheduled before for this data chunk. It is still waiting for the first uplink grant from the cell. This mode does not suggest that the base station 111 is busy serving other user equipments. It may be the normal uplink grant delay where the base station is processing the scheduling request.

Data in buffer, scheduled means that the data is being scheduled in this TTI. In this state, it is also good to know the percentage and/or amount of radio resources that is scheduled. A percentage number is shown in FIG. 4 indicating the amount of physical resources scheduled.

Data in buffer, no scheduling means that the data chunk has been scheduled before, and there are still data in the uplink buffer of the user equipment. But the data is not scheduled in this TTI. The cell 115 is serving other user equipment in this TTI.

The scheduling frequency module 301 may perform action 201.

Action 202

The user equipment 121 further obtains a radio quality measure related to the radio link. The radio quality measure will be used as input to the prediction of the available throughput. In LTE networks the radio quality measure may be any one or more out of a CQI value and a transmission rank.

A basic radio quality estimation protocol will now be outlined. Typically a scheduling is processed on a TTI basis, such as 1 ms, but the reporting of the CQI and Rank values may be on a larger time scale, i.e., less frequent. $T_r$ may represent the estimation period used to request CQI and Rank information. The estimation process may use the following steps Each estimation period the user equipment 121 requests its CQI and Rank information. To do so it transmits a Sounding Reference Signal (SRS) to the base station 111. This signal is known in advance at the base station 111.

The base station 111 receives the SRS.

The base station 111 processes the SRS and extracts SINR and Rank information from it.

The base station 111 converts the SINR into a CQI value using a MCS mapping.

The base station 111 reports the CQI and the Rank to the user equipment 121.

The user equipment 121 needs to have a CQI and Rank value for each TTI. If the estimation period, $T_r$, is longer than a TTI, then the user equipment 121 stores the CQI value and the Rank locally and uses at each TTI the newest stored value.

Action 203

Based on the scheduling frequencies and the radio quality measure, the user equipment 121 may predict or estimate the load and the available throughput in the cell 115. This process may be done either separately or jointly.

Figure 5:
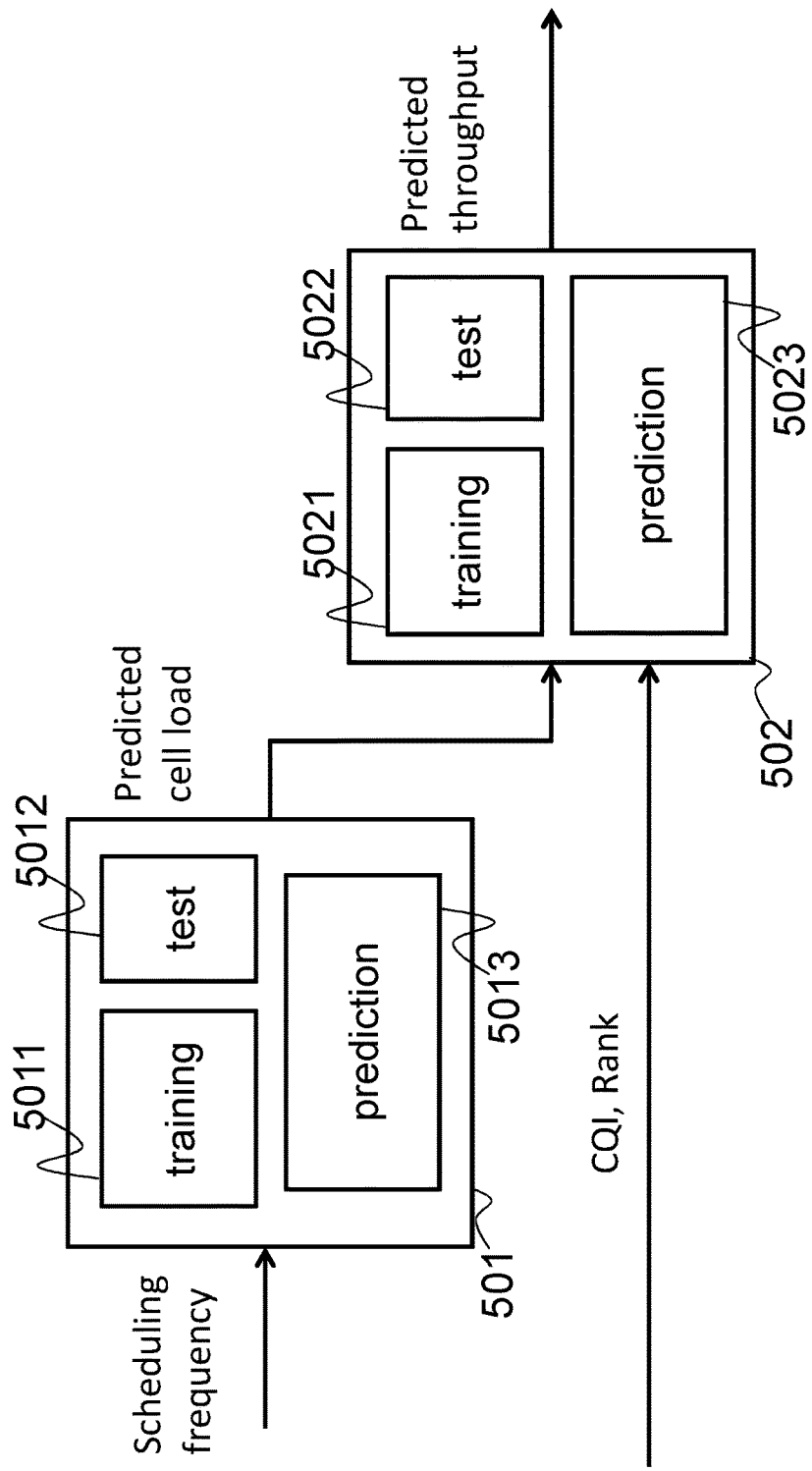
FIG. 5 is a schematic block diagram illustrating further embodiments of a user equipment.

In some embodiments where the user equipment 121 predicts the load and the available throughput in the cell 115 separately the user equipment 121 comprises a load prediction module 501 and the throughput prediction module 502 as illustrated in FIG. 5.

In this optional action, the cell load of the cell 115 is predicted. This load may in turn be used as input to the prediction of the available throughput. Thus, in some embodiments the user equipment 121 predicts a current and/or future cell load of the cell 115 based on the information about a past scheduling of the user equipment 121.

The predicting of the current and/or future cell load of the cell 115 may further be based on:
  a relationship between the information about a past scheduling of the user equipment 121 and the one or more previously obtained pieces of information about the past scheduling of the user equipment 121; and the previously obtained cell load. The previously obtained cell load is associated with the one or more previously obtained pieces of information about a past scheduling.

The previously obtained pieces of information about the past scheduling of the user equipment 121 may for example be related to a training sample. It may also be related to several training samples. The past scheduling that the previously obtained piece of information refers to may be different from the past scheduling that the information about a past scheduling refers to. For example, the information about a past scheduling may relate to a first past scheduling of the user equipment 121, while the previously obtained pieces of information about a past scheduling may relate to a second past scheduling of the user equipment 121. The second past scheduling may be a scheduling that has taken place at an earlier time than the first past scheduling.

Referring to FIG. 5, the load prediction module 501 gathers the scheduling frequency information coming from the scheduling frequency module 301. The load prediction module 501 may be composed of three sub-modules.

A load training sub-module 5011: This sub-module takes a subset of the scheduling frequency information and maps this subset of data to a previously obtained cell load, e.g. a measured cell load, or a previously computed cell load, which is computed from the one or more previously obtained pieces of information about a past scheduling. Machine learning or other mathematical numerical methods may be used for this purpose. Examples of algorithms are linear regression and neural networks.

The input of the training sub-module may be a training data set, i.e. a vector of scheduling frequency information as described above. The size of this vector depends on the number of TTIs that are used for the training dataset in machine learning to learn the cell load. A large vector may provide a better fit with more accurate prediction result but requires the user to wait longer. The "no data in buffer"-cases are extracted and the three other cases are kept for learning. Indeed if a machine learning system has enough "data in buffer"-samples they are the most relevant for estimating the load. However, if the machine learning system has few of these samples and many "waiting for first uplink transmission"-samples it may mean that the user equipment 121 cannot get any scheduling grant because the network is very loaded.

The output of the training sub-module is a model that will allow estimating the cell load of the cell 115 from the scheduling frequency. The cell load may be characterized by different metrics. For example it may be characterized by a total cell throughput or the number of active users in the cell 115.

A load test sub-module 5012: This sub-module tests the model developed by the training sub-module on another data subset of the scheduling frequency information. The load test sub-module then estimates the correctness of the developed model. Possibly, if the correctness is too weak, the load test sub-module may provide feedback, such as an estimation error, to the training sub-module.

A load prediction sub-module 5013: When the training phase is terminated, new samples of scheduling frequency information is processed by the load prediction sub-module. This sub-module applies the model developed in the training phase to each new test sample.

Action 204

The user equipment 121 predicts the available throughput based on:
the relationship between the information about a past scheduling of the user equipment 121 and one or more previously obtained pieces of information about the past scheduling of the user equipment 121;
a relationship between the radio quality measure and one or more previously obtained radio quality measures; and
a previously obtained throughput of uplink data sent from the user equipment 121 to the base station 111. The previously obtained throughput is associated with the one or more previously obtained pieces of information about a past scheduling and the one or more previously obtained radio quality measures.

In some embodiments where the user equipment 121 predicts the load and the available throughput in the cell 115, the available throughput is further predicted based on a relationship between the predicted current and/or future cell load of the cell 115 and a previously obtained cell load.

In other words, in the case of separate load and throughput prediction, the throughput prediction is directly based on the predicted cell load, which predicted cell load in turn is based on the information about a past scheduling of the user equipment 121.

Thus, the throughput prediction module 303, 502 gathers both the load prediction from the load prediction module 501 and the radio quality measure, such as CQI and Rank information, from the radio quality module 302. It may be composed of three sub-modules.

The throughput training sub-module 5021: This sub-module takes a subset of input information and maps this subset of data to a measured throughput of the user equipment 121. Machine learning or other mathematical numerical methods may be used for this purpose. Examples of algorithms are linear regression or neural networks.

The input information of the throughput training sub-module 5021 is the previously obtained cell load, which may be a predicted cell load, and one or more previously obtained radio quality measures, such as a previously obtained CQI value and a previously obtained Rank value.

The output of the training sub-module is a model that will allow for estimating the available uplink throughput.

The throughput test sub-module 5022: This sub-module tests the model developed in the throughput training sub-module on another data subset of the cell load and the radio quality measure, and estimate the correctness of the developed model. Possibly, if the correctness is too weak, the throughput test sub-module may provide feedback, such as an estimation error, to the throughput training sub-module.

The throughput prediction sub-module 5023: When the training phase is terminated, each new set of the predicted cell load, and radio quality measure, such as CQI and Rank values, is processed by the throughput prediction sub-module. This sub-module applies the model developed in the training phase to each new data set.

An advantage of processing the load prediction and the throughput prediction separately is that the predicted load may be reused by a different estimation or prediction module.

Figure 6:
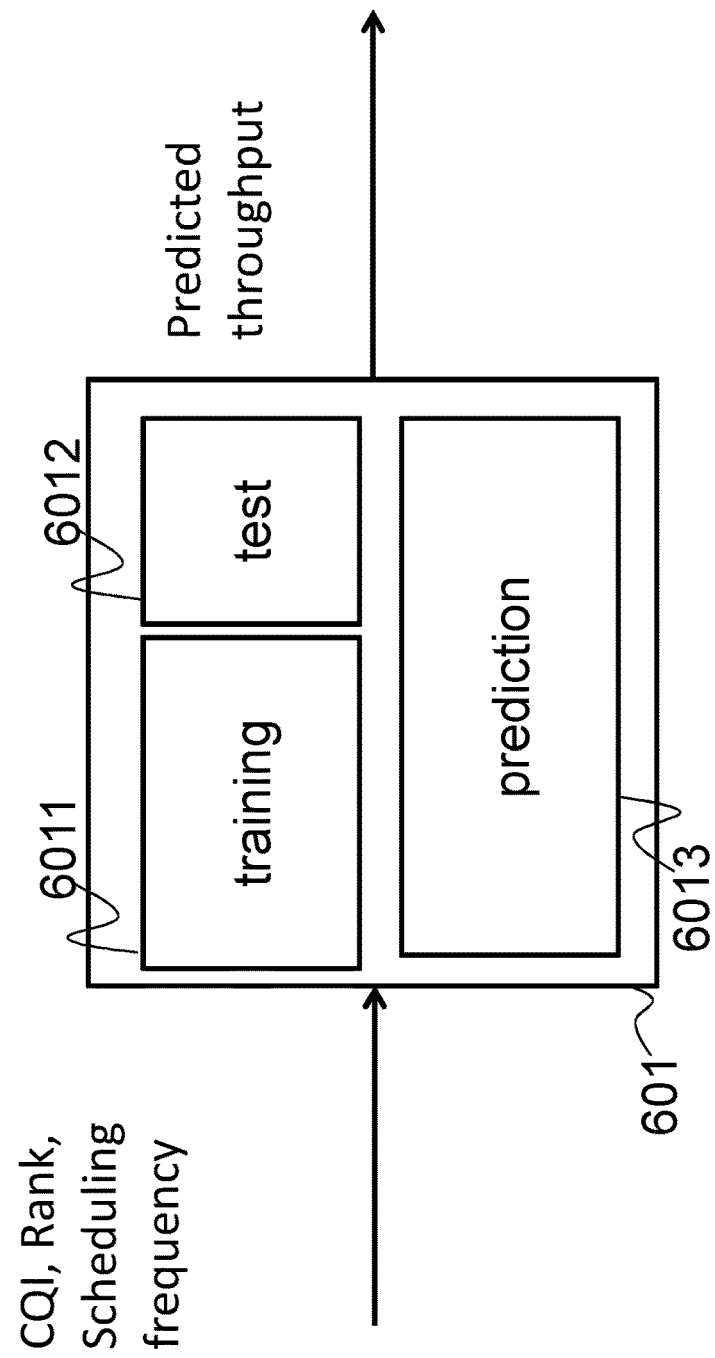
FIG. 6 is a schematic block diagram illustrating further embodiments of a user equipment.

In some embodiments wherein the user equipment 121 predicts the load and the available throughput in the cell 115 jointly, the user equipment 121 comprises the throughput prediction module 301, 601 as illustrated in FIG. 6.

The throughput prediction module 303, 601 gathers the scheduling frequency information from the scheduling frequency module 301 and the CQI and Rank information from the radio quality module 302. It may be composed of three sub-modules.

A joint throughput training module 6011: this sub-module takes a subset of input information and maps this subset of data to a measured throughput of the user equipment 121. Machine learning or other mathematical numerical methods may be used for this purpose. Examples of algorithms are linear regression or neural networks.

The input of the joint throughput training sub-module is the scheduling frequency information, and the radio quality measure, such as the CQI value and the Rank value.

The output of the training sub-module is a model that will allow for estimating the available uplink throughput.

A joint throughput test module 6012: this sub-module tests the model developed in the throughput training module on another data subset of the scheduling frequency information and estimates the correctness of the developed model. Possibly, if the correctness is too weak, the joint throughput test module may provide feedback, such as an estimation error, to the joint throughput training sub-module.

A joint throughput prediction module 6013: When the training phase is terminated, each new set of the scheduling frequency information, CQI and Rank values is processed by the throughput prediction sub-module. This sub-module applies the model developed in the training phase to each new data set.

An advantage of the joint load and throughput prediction is that the joint learning may provide a better estimation since a correlation between the scheduling frequency information, the CQI and the Rank values may be used.

Action 205

When the user equipment 121 has predicted the cell load of the cell 115 and/or predicted the available throughput for uplink data, the user equipment 121 may display any one or more out of: the predicted available throughput, and the predicted current and/or future cell load of the cell 115 on the display 122 of the user equipment 121. This may be done in order to receive an input, as described in action 206, related to a service that is affected by the available throughput for uplink data. An advantage with this is that the user equipment 121 may optimize a quality of service based on the input received, as described in action 207. For example, the input may be a command to start a new service or not, or to proceed with downloading of data immediately or to wait with downloading data for a period of time.

Action 206

In some embodiments the user equipment 121 receives an input in response to the displayed predicted cell load of the cell 115 and/or the displayed predicted available throughput for uplink data. The input may be received from a user of the user equipment.

Action 207

The user equipment 121 optimizes a quality of service based on any one or more out of the predicted available throughput and the predicted current and/or future load.

The optimization of the quality of service may further be based on the input received in action 206. For example, the user equipment 121 may adapt the resolution of a streamed video, for communication services like Skype, based on any one or more out of the predicted available throughput and the predicted current and/or future load, or in other words based on the expected performance of the service.

Action 208

In order to obtain training data for future predictions the user equipment 121 may obtain an actual throughput of uplink data sent to the base station 111 and an actual cell load of the cell 115. In other words, the user equipment 121 may obtain any one or more out of: a throughput of uplink data sent to the base station 111, and a cell load of the cell 115. The obtained cell load is associated with the obtained throughput of the uplink data sent to the base station 111.

The obtained throughput and the obtained cell load may be used e.g. by the training sub-modules. In future predictions the obtained throughput of uplink data may be used as the previously obtained throughput, as described above in action 204, and the obtained cell load of the cell 115 may be used as the previously obtained cell load, as described above in action 203.

Action 209

In some embodiments the user equipment 121 stores any one or more out of: the obtained information about the scheduling of the user equipment 121, the obtained radio quality measure, the throughput of the uplink data sent to the base station 111, and the cell load of the cell 115. For example, the user equipment 121 may store the obtained information about the scheduling of the user equipment 121 together with the cell load of the cell 115 in order to have training data for prediction of the cell load. In another example the user equipment 121 may store the obtained information about the scheduling of the user equipment 121 together with the obtained radio quality measure, and the throughput of the uplink data sent to the base station 111 in order to have training data for prediction of the available throughput.

Figure 7:
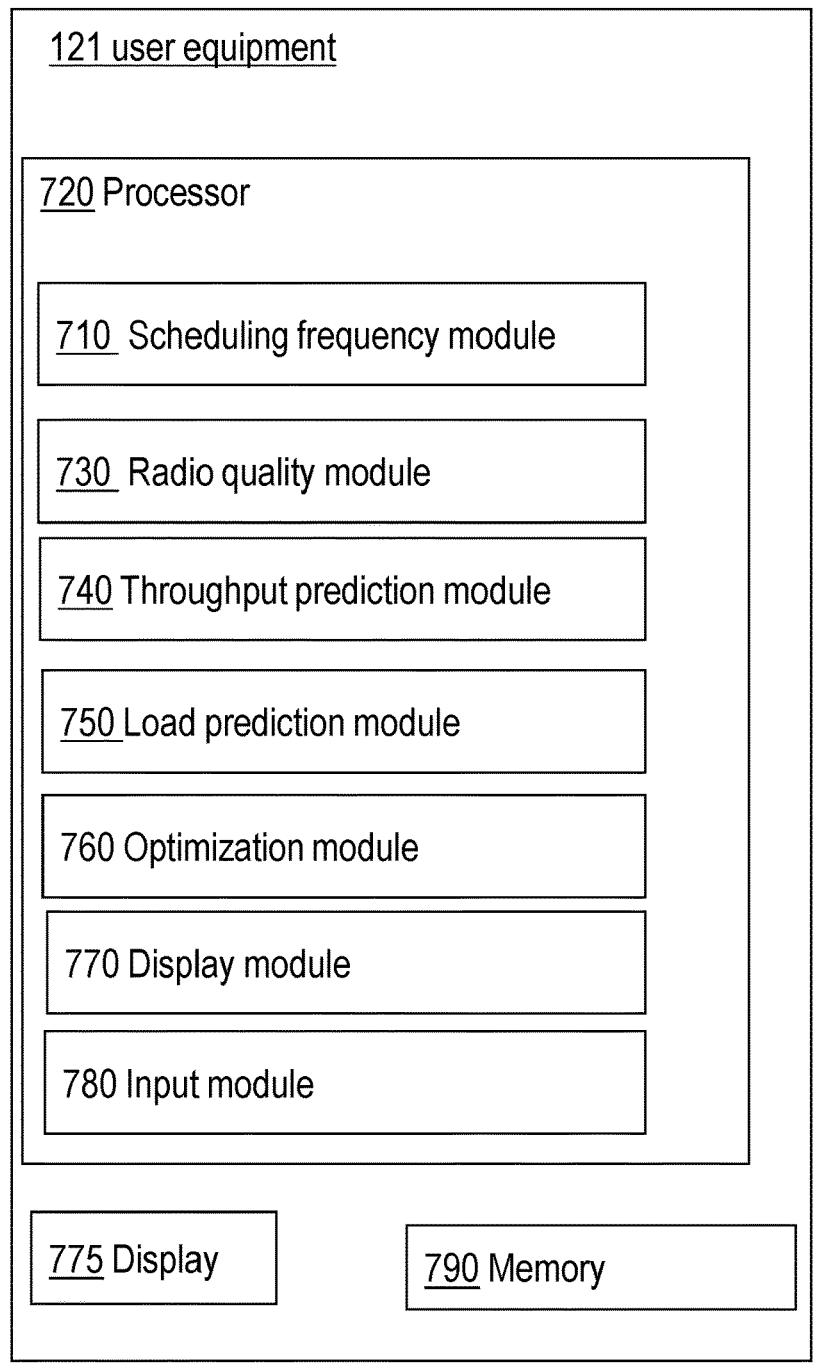
FIG. 7 is a schematic block diagram illustrating further embodiments of a user equipment.

To perform the method actions to predict an available throughput for uplink data to be sent from the user equipment 121 to the base station 111 over the radio link in the communications network 100 described above in relation to FIG. 2, the user equipment 121 comprises the following arrangement depicted in FIG. 7. As mentioned above, the available throughput is provided by the communications network 100 to the user equipment 121.

The user equipment 121 is configured to, e.g. by means of the scheduling frequency module 301, 710 configured to, obtain the information about a past scheduling of the user equipment 121.

The user equipment 121 may further be configured to obtain the information about the past scheduling by being configured to obtain for each TTI for which the user equipment 121 had uplink data in the uplink buffer, any combination out of:
- the number of physical resource blocks that are scheduled for the user equipment 121 for the priority class;
- the total number of physical resource blocks in the cell 115; and
- the information about the buffer status of the user equipment 121. The information comprises the amount of uplink data per priority class.

The scheduling frequency module 301, 710 may be comprised in a processor 720 in the user equipment 121.

The user equipment 121 is further configured to, e.g. by means of the radio quality module 301, 730 configured to, obtain a radio quality measure related to the radio link.

The radio quality measure may be any combination out of a CQI value and a transmission rank.

The radio quality module 301, 730 may be comprised in the processor 720 in the user equipment 121.

The user equipment 121 is further configured to, e.g. by means of the throughput prediction module 303, 502, 601, 740 configured to, predict the available throughput based on:
- the relationship between the information about a past scheduling of the user equipment 121 and the one or more previously obtained pieces of information about the past scheduling of the user equipment 121;

the relationship between the radio quality measure and the one or more previously obtained radio quality measures; and the previously obtained throughput of uplink data sent from the user equipment 121 to the base station 111. The previously obtained throughput is associated with the one or more previously obtained pieces of information about a past scheduling and the one or more previously obtained radio quality measures.

In some embodiments the user equipment 121 is further configured to, e.g. by means of the throughput prediction module 303, 502, 601, 740 configured to, obtain the throughput of the uplink data sent to the base station 111.

The throughput prediction module 303, 502, 601, 740 may be comprised in the processor 720 in the user equipment 121.

In some embodiments the user equipment 121 is arranged to be located in the cell 115 served by the base station 111. Then the user equipment 121 is further configured to, e.g. by means of the load prediction module 501, 750 configured to:
predict a current and/or future cell load of the cell 115 based on the information about a past scheduling of the user equipment 121, and
predict the available throughput, further based on a relationship between the current and/or future cell load of the cell 115 and a previously obtained cell load.

The user equipment 121 may further be configured to, e.g. by means of the load prediction module 501, 750 configured to, predict the current and/or future cell load of the cell 115 further based on:
the relationship between the information about the past scheduling of the user equipment 121 and the one or more previously obtained pieces of information about the past scheduling of the user equipment 121; and
the previously obtained cell load. The previously obtained cell load is associated with the one or more previously obtained pieces of information about a past scheduling.

In some embodiments the user equipment 121 may further be configured to, e.g. by means of the load prediction module 501, 750 configured to, obtain the cell load of the cell 115. The load is associated with the throughput of the uplink data sent to the base station 111.

The load prediction module 501, 750 may be comprised in the processor 720 in the user equipment 121.

In some embodiments the user equipment 121 is further configured to, e.g. by means of an optimization module 760 configured to, optimize the quality of service based on the prediction of the available throughput.

The user equipment 121 may be further configured to, e.g. by means of the optimization module 760 configured to, optimize the quality of service further based on the input.

The optimization module 780 may be comprised in the processor 720 in the user equipment 121.

The user equipment 121 may further be configured to, e.g. by means of a display module 770 configured to, display any one or more out of: the predicted available throughput, and the predicted current and/or future cell load of the cell 115 on the display 122, 775 of the user equipment 121.

The display module 770 may be the processor 720 in the user equipment 121.

In some embodiments the user equipment 121 is further configured to, e.g. by means of an input module 780 configured to, receive an input.

The input module 780 may be comprised in the processor 720 in the user equipment 121.

The user equipment 121 may further be configured to, e.g. by means of a memory 790 configured to, store any combination of the obtained information about the scheduling of the user equipment 121, the obtained radio quality measure, the throughput of the uplink data sent to the base station 111 and the cell load of the cell 115. The memory 790 comprises one or more memory units. The memory 790 is further configured to store the input, and configurations and applications to perform the methods herein when being executed in the user equipment 121.

The embodiments herein to predict an available throughput for uplink data to be sent from the user equipment 121 to the base station 111 over the radio link in the communications network 100 may be implemented through one or more processors, such as the processor 720 in the user equipment 121 depicted in FIG. 7, together with computer program code for performing the functions and actions of the embodiments herein. The program code mentioned above may also be provided as a computer program product, for instance in the form of a data carrier carrying computer program code for performing the embodiments herein when being loaded into the user equipment 121. One such carrier may be in the form of a CD ROM disc. It is however feasible with other data carriers such as a memory stick. The computer program code may furthermore be provided as pure program code on a server and downloaded to the user equipment 121.

Those skilled in the art will also appreciate that the scheduling frequency module 301, 710, the radio quality module 302, 730, the throughput prediction module 303, 502, 601, 740, the load prediction module 501, 750, the optimization module 760, the display module 770, and the input module 780 described above may refer to a combination of analog and digital circuits, and/or one or more processors configured with software and/or firmware, e.g. stored in a memory, that when executed by the one or more processors such as the processor 720 perform as described above. One or more of these processors, as well as the other digital hardware, may be included in a single Application-Specific Integrated Circuit (ASIC), or several processors and various digital hardware may be distributed among several separate components, whether individually packaged or assembled into a System-on-a-Chip (SoC).

When using the word "comprise" or "comprising" it shall be interpreted as non-limiting, i.e. meaning "consist at least of".

The embodiments herein are not limited to the above described preferred embodiments. Various alternatives, modifications and equivalents may be used. Therefore, the above embodiments should not be taken as limiting the scope, which is defined by the appending claims.

The invention claimed is:

1. A method in a user equipment for estimating an available throughput for uplink data to be sent from the user equipment to a base station over a radio link in a wireless communications network, wherein the available throughput is provided by the wireless communications network to the user equipment, the method comprising:
obtaining information about a past scheduling of the user equipment;
obtaining a radio quality measure related to the radio link; and
estimating the available throughput based on:
a relationship between the information about a past scheduling of the user equipment and one or more previously obtained pieces of information about the past scheduling of the user equipment;

a relationship between the radio quality measure and one or more previously obtained radio quality measures; and a previously obtained throughput of uplink data sent from the user equipment to the base station, wherein the previously obtained throughput is associated with the one or more previously obtained pieces of information about the past scheduling and the one or more previously obtained radio quality measures; and optimizing a quality of service based on one or more of the estimated available throughput and estimated current and future cell loads.

2. The method according to claim 1, wherein the obtaining of the information about a past scheduling comprises obtaining for each Transmission Time Interval, TTI, for which the user equipment had uplink data in an uplink buffer, any combination of:

a number of physical resource blocks that are scheduled for the user equipment for a priority class;

a total number of physical resource blocks in a cell where the user equipment is located; and information about a buffer status of the user equipment, wherein the information about the buffer status comprises an amount of uplink data per priority class.

3. The method according to claim 1, wherein the radio quality measure is one or more of a Channel Quality Information (CQI) value and a transmission rank.

4. The method according claim 1, wherein the user equipment is located in a cell served by the base station, and wherein the method further comprises estimating the current and/or future cell load of the cell based on the information about a past scheduling of the user equipment, and wherein the estimation of the available throughput is further based on a relationship between the current and/or future cell load of the cell and a previously obtained cell load.

5. The method according to claim 4, wherein the estimation of the current and/or future cell load of the cell is further based on:

the relationship between the information about a past scheduling of the user equipment and the one or more previously obtained pieces of information about the past scheduling of the user equipment; and the previously obtained cell load, wherein the previously obtained cell load is associated with the one or more previously obtained pieces of information about a past scheduling.

6. The method according to claim 4, further comprising:
displaying one or more of: the estimated available throughput, and the estimated current and/or future cell load of the cell on a display of the user equipment; and
receiving an input, wherein the optimizing of the quality of service is further based on the input.

7. The method according to claim 1, further comprising: obtaining one or more of:

a throughput of uplink data sent to the base station, and a cell load of a cell where the user equipment is located, wherein the cell load is associated with the throughput of the uplink data sent to the base station; and storing one or more of: the obtained information about the scheduling of the user equipment, the obtained radio quality measure, the throughput of the uplink data sent to the base station, and the cell load of the cell.

8. A user equipment configured to estimate an available throughput for uplink data to be sent from the user equipment to a base station over a radio link in a wireless communications network, wherein the available throughput is provided from the wireless communications network to the user equipment, the user equipment comprising:

communication circuitry configured to communicate with the base station over the radio link; and processing circuitry operatively associated with the communication circuitry and configured to:

obtain information about a past scheduling of the user equipment;

obtain a radio quality measure related to the radio link; and estimate the available throughput based on:

a relationship between the information about a past scheduling of the user equipment and one or more previously obtained pieces of information about the past scheduling of the user equipment;

a relationship between the radio quality measure and of one or more previously obtained radio quality measures; and a previously obtained throughput of uplink data sent from the user equipment to the base station, wherein the previously obtained throughput is associated with the one or more previously obtained pieces of information about the past scheduling and the one or more previously obtained radio quality measures; and optimize a quality of service based on one or more of the estimated available throughput and Ma estimated current and future cell loads.

9. The user equipment according to claim 8, wherein the processing circuitry is configured to obtain the information about a past scheduling by being configured to obtain for each Transmission Time Interval (TTI) for which the user equipment had uplink data in an uplink buffer, any combination out of:

a number of physical resource blocks that are scheduled for the user equipment for a priority class;

a total number of physical resource blocks in a cell where the user equipment is located; and information about a buffer status of the user equipment, wherein the information about the buffer status comprises an amount of uplink data per priority class.

10. The user equipment according to claim 8, wherein the radio quality measure is any combination of a Channel Quality Information (CQI) value and a transmission rank.

11. The user equipment according claim 8, wherein the user equipment is arranged to be located in a cell served by the base station and the processing circuitry is configured to:

estimate the current and/or future cell load of the cell based on the information about a past scheduling of the user equipment; and estimate the available throughput, further based on a relationship between the current and/or future cell load of the cell and a previously obtained cell load.

12. The user equipment according to claim 11, wherein the processing circuitry is configured to estimate the current and/or future cell load of the cell further based on:

the relationship between the information about a past scheduling of the user equipment and the one or more previously obtained pieces of information about the past scheduling of the user equipment; and a previously obtained cell load, which previously obtained cell load is associated with the one or more previously obtained pieces of information about a past scheduling.

13. The user equipment according to claim 11, wherein the processing circuitry is configured to:
- display one or more of: the estimated available throughput, and the estimated current and/or future cell load of the cell on a display of the user equipment;
- receive an input; and
- optimize the quality of service further based on the input.

14. The user equipment according to claim 8, wherein the processing circuitry is configured to:
- obtain one or more of:
    - a throughput of an uplink data sent to the base station, and
    - a cell load of a cell where the user equipment is located, wherein the cell load is associated with the throughput of the uplink data sent to the base station; and
- store any combination of the obtained information about the scheduling of the user equipment, the obtained radio quality measure, the throughput of the uplink data sent to the base station and the cell load of the cell.

* * * * *